(12) United States Patent
Dive et al.

(10) Patent No.: US 6,545,980 B1
(45) Date of Patent: Apr. 8, 2003

(54) SYNCHRONOUS TRANSMISSION SYSTEM WITH FAULT LOCATION FUNCTION AND MONITORING DEVICE THEREFOR

(75) Inventors: Geoffrey Dive, Aspach (DE); Werner Beisel, Ludwigsburg (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/171,238

(22) PCT Filed: Apr. 24, 1997

(86) PCT No.: PCT/EP97/02428

§ 371 (c)(1),
(2), (4) Date: Dec. 15, 1998

(87) PCT Pub. No.: WO97/40598

PCT Pub. Date: Oct. 30, 1997

(30) Foreign Application Priority Data

Apr. 24, 1996 (DE) .......................................... 196 16 286

(51) Int. Cl.[7] ............................................. G01R 31/08
(52) U.S. Cl. ..................................... 370/242; 709/224
(58) Field of Search ................................. 370/270, 228, 370/241, 907, 241.1, 242–252; 709/230, 100, 250, 236, 223, 224

(56) References Cited

U.S. PATENT DOCUMENTS

| 5,390,179 A | | 2/1995 | Killian et al. .............. 370/68.1 |
| 5,555,248 A | | 9/1996 | Sugawara et al. ........... 371/5.1 |
| 5,574,723 A | | 11/1996 | Killian et al. .............. 370/68.1 |
| 5,600,648 A | * | 2/1997 | Furuta et al. ............... 370/248 |
| 5,742,762 A | * | 4/1998 | Scholl et al. ............... 709/200 |
| 6,061,329 A | * | 5/2000 | Abe .......................... 340/825.01 |
| 6,104,702 A | * | 8/2000 | Vissers ....................... 370/241 |

FOREIGN PATENT DOCUMENTS

| DE | 44 09 644 A1 | | 3/1995 | |
| GB | 2 287 608 A | | 9/1995 | |
| SE | WO9413073 A1 | * | 6/1994 | ............. H04J/3/14 |

OTHER PUBLICATIONS

Yasuda, Y and Yoshhikai,N, Automated Netwrok Connection Tracing and Data Gathering Methods using Overhead Byter in the SDH Frame Structure, IEEE Transactions on Communications, vol. 42 No 2/3/4 Feb./Mar./Apr. 1994 pp. 1065–1075.*

O.G. Soto et al., "SDH Network Planning and Management," in *Electrical Communication*, 4th quarter 1993, pp. 366–377.

Yasuda et al., "Automated Network Connection Tracing and Data Gathering Methods in the SDH Network," in *IEEE Transactions on Communications*, vol. 42, No. 2/3/4, Mar.–Apr. 1994, pp. 1065–1075.

ITU–T Recommendation G.707 (Draft), Network Node Interface for the SDH, Nov. '95, pp. 1–125.

* cited by examiner

*Primary Examiner*—David Vincent
(74) *Attorney, Agent, or Firm*—Milton Oliver; Ware, Fressola, Van Der Sluys & Adolphson

(57) ABSTRACT

A synchronous transmission system is disclosed in which the transmission paths (leased lines) extend over several individual transmission systems (Sx). Monitoring devices (NIM) with access to at least one byte of the control data area are provided in synchronous transmission systems to write data into or read data out of the control data area. The monitoring devices (NIM) may thus be controlled and monitored by a signal source (S1).

7 Claims, 1 Drawing Sheet

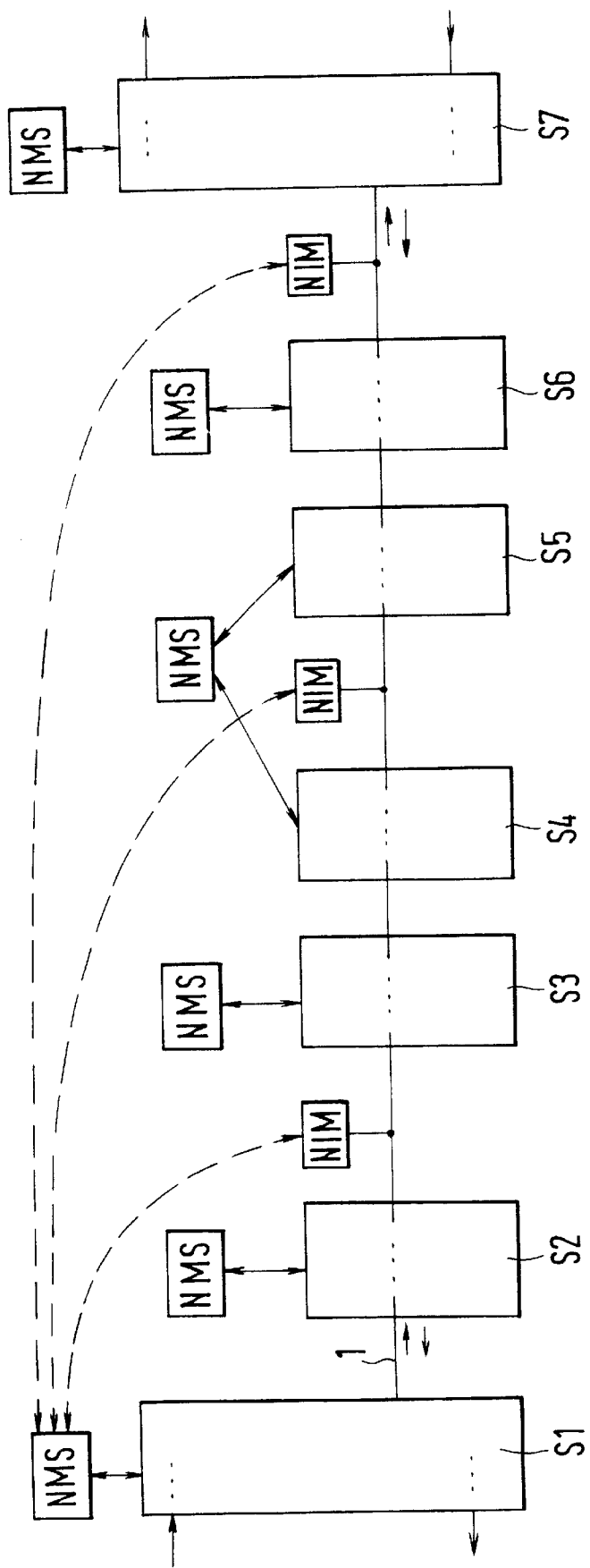

SYNCHRONOUS TRANSMISSION SYSTEM WITH FAULT LOCATION FUNCTION AND MONITORING DEVICE THEREFOR

FIELD OF THE INVENTION

The invention concerns a synchronous transmission system for digital signals to be combined into a multiplex signal.

The invention also concerns a monitoring device for a synchronous transmission system and a method for localizing a fault in a transmission path between a data source and a data sink in a synchronous transmission system.

DESCRIPTION OF RELATED ART

A synchronous transmission system for digital signals to be combined into a multiplex signal is, for example, a transmission system for the Synchronous Digital Hierarchy (SDH) or a transmission system for synchronous optical networks according to the SONET standard that has been adopted by the American National Standards Institute. In a transmission system for the Synchronous Digital Hierarchy and in a SONET transmission system, signals to be transmitted are combined according to a predefined pattern into a multiplex signal, and structured according to frames. A frame of this kind is referred to in SDH as a Synchronous Transport Module (STM); it is described, for example, in ITU-T Recommendation G.707 (Draft) (11/95). The frame consists of 270 columns and 9 rows. Each column of a row contains one byte: the "section overhead" (SOH) for control and fault detection data is provided in columns 1 through 9 of lines 1 through 3 and 5 through 9. A pointer management unit, which is referred to as an "AU pointer," is provided in the fourth row of columns 1 through 9. The remaining columns and rows contain the useful information (the "STM-1 payload"). An STM-1 payload is, for example, housed in a virtual container VC-4 which comprises a region for payload data and a region for control data (path overhead (POH)).

In a transmission system, individual network elements are connected to one another via one or more transmission media (e.g. copper cables, fiber optic cables). One of the network elements is assigned the function of a control center which monitors and controls the transmission system. The control center and its functions are usually regarded as a network management system (NMS). This NMS, for example, detects any interruption in the transmission path, diverts signal traffic onto an error-free transmission path, and causes the interruption to be repaired. The functions of network management systems are known, for example, from O. Gonzales Soto et al., "Netzplanung und -management" [Network planning and management], Elektrisches Nachrichtenwesen (Alcatel), 4th quarter 1993, pp. 366–377. This describes the basic principles of network level management (NLM). Transmission paths and associated connections are checked by NLM processes for their availability and performance capability. NLM processes are responsible for assigning certain messages of the network elements to specific elements in the network level.

At one network element, a signal intended for a different network element is inserted into the transmission path; this network element represents a signal source. The network element which receives this signal, on the other hand, represents a signal drain. The NMS monitors whether the signal arrives at the signal drain, and whether faults have occurred in the signal. It is evident from this that the transmission system and the NMS operate most effectively if the transmission system is the responsibility of a single system operator which has equal access to the signal source and the signal drain.

The region of a virtual container for the control data (the POH) is described in detail in section 9.3, pages 62 through 68 of the aforesaid ITU-T Recommendation G.707 (Draft). The POH of, for example, a VC-3 or VC-4 comprises nine bytes, which are designated J1, B3, C2, G1, F2, H4, F3, K3, and N1. The G1 byte (see section 9.3.1.4) is used to transmit data which provide information as to the status of the transmission path. The fifth bit of the G1 byte is set (logical state 1) if the transmission path is defective, and thus offers a possibility for monitoring the transmission path. The fifth bit is referred to as the remote defect indication (RDI).

A further possibility for monitoring the transmission path is indicated in Annex C, pages 91 through 103, and Annex D, pages 104 through 107, of ITU-T Recommendation G.707. The tandem connection monitoring (TCM) protocol disclosed there uses the N1 byte of the POH, which is referred to as the tandem connection overhead (TCOH).

In the article "Automated Network Connection Tracing and Data Gathering Methods in the SDH Network" (IEEE Transactions on Communications Vol. 42, no. 2/3/4, February/March/April 1994, pp. 1065–1075) of Y. Yasuda et al., two methods are indicated for testing connections in an individual transmission system: the ID Stamp method and the Path Trace method. Both methods use the single central network management system which is allocated to the one individual transmission system in order to collect and analyze monitoring data and coordinate the monitoring functions. These methods are therefore not to be used in a transmission system which is made up of several individual transmission systems each having its own network management system.

In known transmission systems for the Synchronous Digital Hierarchy which are made up of several individual transmission systems each having its own network management system, no features are provided for localizing errors, which occur.

SUMMARY OF THE INVENTION

It is the object of the Invention to provide a synchronous transmission system and a method in which effective and economic error localization is guaranteed. A synchronous transmission system having monitoring devices, which can modify at least one predetermined byte of control data during transmission of a frame, achieves this object, and a method including the steps of creating a data channel between monitoring device and signal source, and using the channel to report any transmission fault to the signal source, also achieves this object. Another object of the invention is to provide a monitoring device for a synchronous transmission system.

One advantage of the invention is that exact error location, and identification of the type of error, are possible.

BRIEF DESCRIPTION OF THE DRAWING

The invention will be explained in more detail below, in exemplary fashion, with reference to a drawing which shows a schematic synchronous transmission system that comprises several individual transmission systems Sx, where x=1 through 7. The synchronous transmission system and individual transmission systems Sx are SDH systems. Individual transmission systems Sx are connected to one another via one or more transmission media 1, e.g. fiber optic cables or coaxial cables. Each individual transmission system Sx, and the network elements present therein (cross-connects and add/drop multiplexers) is monitored and controlled by a higher-order network management system, NMS.

DETAILED DESCRIPTION OF THE

In the Figure, individual transmission systems Sx are arranged one after another from left to right. Except for individual transmission systems S4 and S5 which have a shared network management system NMS, a single network management system NMS is allocated to each individual transmission system Sx. In the transmission system shown, individual transmission system S1 represents a signal source, for example for an STM-1 signal, which is to be transmitted to a signal drain, i.e. to individual transmission system S7. The transmission path which is thus brought into being between the signal source and signal drain represents a leased line which a customer has ordered from the operator of individual transmission system S1. The customer wishes to transmit his payload data reliably to individual transmission system S7.

In order to ensure this, several monitoring devices NIM are inserted into the leased line. In the Figure, monitoring devices NIM are inserted between the following individual transmission systems Sx: between S2 and S3, between S4 and S5, and between S6 and S7. These monitoring devices NIM are controlled and monitored by the network management system NMS of the signal source (S1). Monitoring devices NIM send their messages to this network management system NMS. The network management system NMS of the signal source thus has control over the entire leased line, and can thereby better perform its task of ensuring reliable data transmission. Monitoring devices NIM can, as shown in the Figure, be arranged outside individual transmission system Sx, although an arrangement inside individual transmission systems Sx, or a combination of the two arrangement possibilities, is also possible. In all cases, however, monitoring devices NIM are controlled and monitored by the respective signal source.

One communication possibility for a control and monitoring function of this kind is offered by a data channel. Free bits of POH bytes K3, K4, N1, N2, or G1 can be used for this data channel. Monitoring devices NIM can, as already mentioned, send messages through this data channel in the upstream direction to the signal source. Examples of such messages include "loss of signal" (LOS), cause and location of loss of signal, "message received," and replies to polling queries from the signal source to the downstream monitoring devices NIM.

If the signal source sends a message in the data channel to, for example, the monitoring device NIM farthest away from it, that message is allowed to pass unchanged (in transparent mode) by the monitoring devices NIM located closer in.

A data channel of this kind creates the capability for the entire leased line to be monitored by the signal source, even if the leased line extends beyond national borders or if the leased line within one country is made up of several individual transmission systems which belong to several different operators. This kind of capability will become increasingly important, since multinational corporations have an increasing need for international telecommunications connections and for leased lines. In addition, a greater number of system operators will be present as deregulation of the telecommunications market proceeds. The result is that in some circumstances, signal transmission from the signal source to the signal drain is accomplished via a large number of individual transmission systems which belong to a correspondingly large number of system operators.

The problem resulting from this will be described using an example. A customer has entered into a contract with a system operator concerning a leased line which extends over a plurality of national borders, over a large number of individual transmission systems belonging to several system operators, and over several time zones. The system operator which has entered into the contract with the customer is responsible to the customer for the entire leased line. The NMS which the system operator has for its transmission system is effective only in its transmission system. If a fault, for example an interruption, occurs in the leased line, the signal drain present at the end of the leased line sends an alarm signal (remote defect indication (RDI) or alarm indication signal (AIS)) to the signal source, the result of which is simply to inform the signal source that the signal drain did not receive the signal. It is not possible to localize the interruption by way of the alarm signal.

The tandem connection monitoring (TCM) protocol already mentioned above also does not permit the error to be localized, since the monitoring protocol is used only within the individual transmission systems. One TCM source and one TCM drain, which communicate with one another via the N1 byte, are present in each individual transmission system. The N1 byte is therefore not transmitted from one individual transmission system to another.

Error localization has hitherto been accomplished in practice by the fact that the system operator which has the contract with the customer calls the system operators of the other individual transmission systems and inquires as to the status of the individual transmission system. This procedure is inefficient and time-consuming; in addition, many network elements are unmanned, comprehension problems often exist, and there are differences in working times due to the various time zones.

What is claimed is:

1. A synchronous transmission system for digital signals combined into multiplex signals, transmitted as frames, comprising a transmission path between a signal source (S1), having a network management system, and a signal drain (S7), a plurality of individual transmission systems (Sx), which each contain several network elements, and a network management system (NMS) associated with each individual transmission system, wherein the network management systems control the transmission systems by inserting digital signals bytewise into frames of a predefined frame format;

each frame has respective regions for control data and for payload data, and at least one byte of said region for control data is transmitted along said transmission path back to said signal source (S1), thereby defining a bidirectional data channel for monitoring functions, and further comprising a plurality of monitoring devices, which are controlled by the network management system of the signal source and have access to at least one predefined byte of the region for control data, and which are connected in a manner distributed over the transmission path, so as thus to be able to modify contents of the region for control data.

2. The synchronous transmission system as defined in claim 1, wherein there additionally exists, between the monitoring devices (NIM) and the network management system (NMS) of the signal source (S1), a data channel which is responsible for assuring transmission of a multiplex signal along said transmission path from said signal source (S1) to said signal drain (S7).

3. A monitoring device in a synchronous transmission system comprising several individual transmission systems (Sx), each containing several network elements, collectively defining a synchronous transmission path between a signal source and a signal drain, in which digital signals are combined into multiplex signals, in which the digital signals are inserted bytewise into frames of a predefined format, and in which each frame has regions for control data and regions for payload data, at least one byte of said region for control data being transmitted across successive individual transmission systems; and which monitoring device is connected in said synchronous transmission path and configured such that it has access to at least one predefined byte of the region for control data, so as thus to be able to modify contents of the region for control data, thereby defining a bidirectional data channel for monitoring functions between the signal source (S1) and the monitoring device.

4. A method of localizing a fault in a transmission path between a signal source (S1) and a signal sink (S7) in a synchronous transmission system, in which several individual transmission systems (Sx), which each contain several network elements and which are each associated with a network management system, are present;

in which the digital signals are inserted bytewise into frames of a predefined frame format, and in which each frame has respective regions for control data and for payload data, the method comprising the following steps;

monitoring the transmission path using several monitoring devices which each have access to at least one predefined byte of the region for control data;

creating a bidirectional data channel between a signal source (S1) and one of the monitoring devices for monitoring functions, by modifying data forming a part of said control data region in said frame; and reporting any occurrence of a fault from the one monitoring device to the signal source (S1) via the created data channel by changing at least one byte in said control data region of a transmitted frame.

5. The transmission system as defined in claim 1, wherein
the predefined byte is the K3, K4, N1, N2, or G1 byte, as defined in the Synchronous Digital Hierarchy system of the International Telecommunications Union.

6. The monitoring device as defined in claim 3, wherein
the predefined byte is the K3, K4, N1, N2, or G1 byte, as defined in the Synchronous Digital Hierarchy system of the International Telecommunications Union.

7. The method as defined in claim 4, wherein
the predefined byte is the K3, K4, N1, N2, or G1 byte, as defined in the Synchronous Digital Hierarchy system of the International Telecommunications Union.

\* \* \* \* \*